(12) United States Patent
Fernandez

(10) Patent No.: US 6,493,036 B1
(45) Date of Patent: Dec. 10, 2002

(54) SYSTEM AND METHOD FOR SCALING REAL TIME VIDEO

(75) Inventor: Gustavo A. Fernandez, Sunnyvale, CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/440,309

(22) Filed: Nov. 17, 1999

(51) Int. Cl.[7] .............................. H04N 5/44; H04N 5/45; H04N 9/74

(52) U.S. Cl. ...................... 348/561; 348/581; 348/565; 348/596

(58) Field of Search ................................ 348/561, 448, 348/576, 581, 565, 704, 563, 564, 596, 598; H04N 5/445, 5/45, 5/44, 9/74

(56) References Cited

U.S. PATENT DOCUMENTS

| | | | |
|---|---|---|---|
| 4,215,414 A | 7/1980 | Huelsman | |
| 4,249,213 A | 2/1981 | Imaide et al. | |
| 4,412,251 A | 10/1983 | Tanaka et al. | |
| 4,799,105 A | 1/1989 | Mitchell et al. | |
| 4,987,493 A | 1/1991 | Canfield et al. | |
| 5,008,752 A | 4/1991 | Van Nosttrand | |
| 5,117,289 A | 5/1992 | Farley et al. | |
| 5,119,082 A | * 6/1992 | Lumelsky et al. | .......... 348/596 |
| 5,182,643 A | 1/1993 | Futscher | |
| 5,313,303 A | 5/1994 | Ersoz et al. | |
| 5,369,442 A | 11/1994 | Braun | |
| 5,369,444 A | 11/1994 | Ersoz et al. | |
| 5,432,560 A | 7/1995 | Ersoz et al. | |
| 5,726,682 A | 3/1998 | Lum et al. | |
| 5,815,208 A | 9/1998 | Samela et al. | |

* cited by examiner

Primary Examiner—Sherrie Hsia
(74) Attorney, Agent, or Firm—Blakely, Sokoloff, Taylor & Zafman LLP

(57) ABSTRACT

A video processing apparatus comprising: a selection unit which selects a portion of a first image for magnification; and a magnification unit which magnifies a portion of a second image corresponding to the portion of the first image, the second image being a higher resolution image than the first image.

29 Claims, 9 Drawing Sheets

SYSTEM AND METHOD FOR SCALING REAL TIME VIDEO

BACKGROUND OF THE INVENTION

1. Field of the Invention

This invention relates generally to the field of signal processing. More particularly, the invention relates to an improved system and method for scaling real time video.

2. Description of the Related Art

Numerous systems and methods for magnifying graphics images have been developed over the years. Using these systems and methods, varying portions of a graphics image may be selectively enlarged by different magnification levels. Some of the basic concepts associated with graphics magnification are illustrated in FIG. 1. A monitor 100 (e.g., a computer monitor or other graphics monitor), in response to signals from a video processor, produces a primary graphics image 110. A user may then select a portion 120 of the graphics image 110 for magnification by the video processor to produce a magnified image 130. The size and shape of the selected portion 120 of the graphics image may typically be manipulated by a user via a cursor control device such as a mouse or a keyboard. Additionally, the user may select a desired level of magnification (e.g., 2×, 3×, . . . etc) for the magnified image 130.

The graphics magnification described above may be accomplished via the configuration illustrated in FIG. 2. Data representing the primary graphics image is stored in a first memory space 210. A portion of the primary graphics image data is read from the first memory space 210 by a graphics scaler unit 220, which scales (e.g., magnifies) the primary graphics image data to produce scaled image data. The scaled image data and the primary image data are overlayed (i.e., combined) by a display controller 250. A monitor 100 then decodes the signal output by the display controller 250 to produce the final image (which includes both the scaled image 120 and the primary image 110 as shown in FIG. 1).

Copying portions of graphics image data as described may be accomplished using various techniques, including a technique known as a Bit Block Transfer (hereinafter "BLT"). Generally, a BLT is a technique for moving a rectangular block of graphics data (i.e., typically a rectangular block within a larger block) from a first memory space to a second memory space (e.g., graphics display memory), or within two, perhaps overlapping portions of a single memory space.

Although the magnification of graphics images has been accomplished as described above for quite some time, there is no similar mechanism currently available for magnifying real time video images. Accordingly, what is needed is a system and method for magnifying real time video.

SUMMARY OF THE INVENTION

A video processing apparatus comprising: a selection unit which selects a portion of a first image for magnification; and a magnification unit which magnifies a portion of a second image corresponding to the portion of the first image, the second image being a higher resolution image than the first image.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the present invention.

Embodiments of the present invention includes various steps, which will be described below. The steps may be embodied in machine-executable instructions. The instructions can be used to cause a general-purpose or special-purpose processor which is programmed with the instructions to perform certain steps. Alternatively, these steps may be performed by specific hardware components (e.g., silicon chips) that contain hardwired logic for performing the steps, or by any combination of programmed computer components and custom hardware components.

Elements of the present invention may be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of media suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

A SYSTEM AND METHOD FOR SCALING REAL TIME VIDEO

Figure 1:
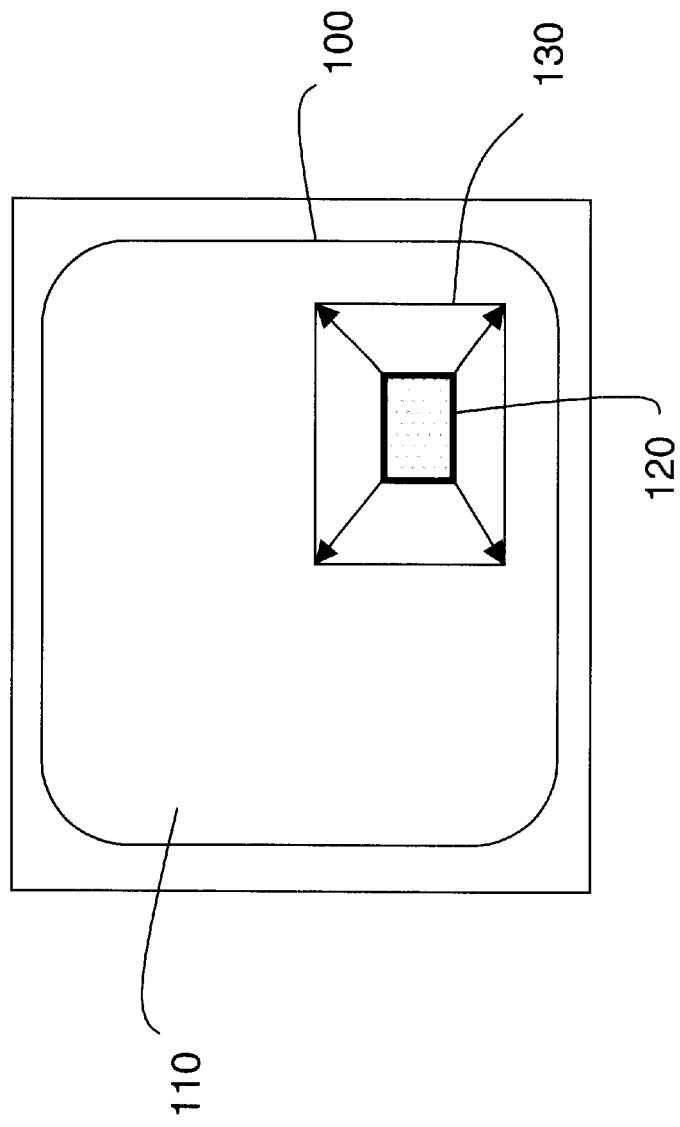
FIG. 1 illustrates a display monitor on which a portion of a graphics image is magnified.
Figure 2:
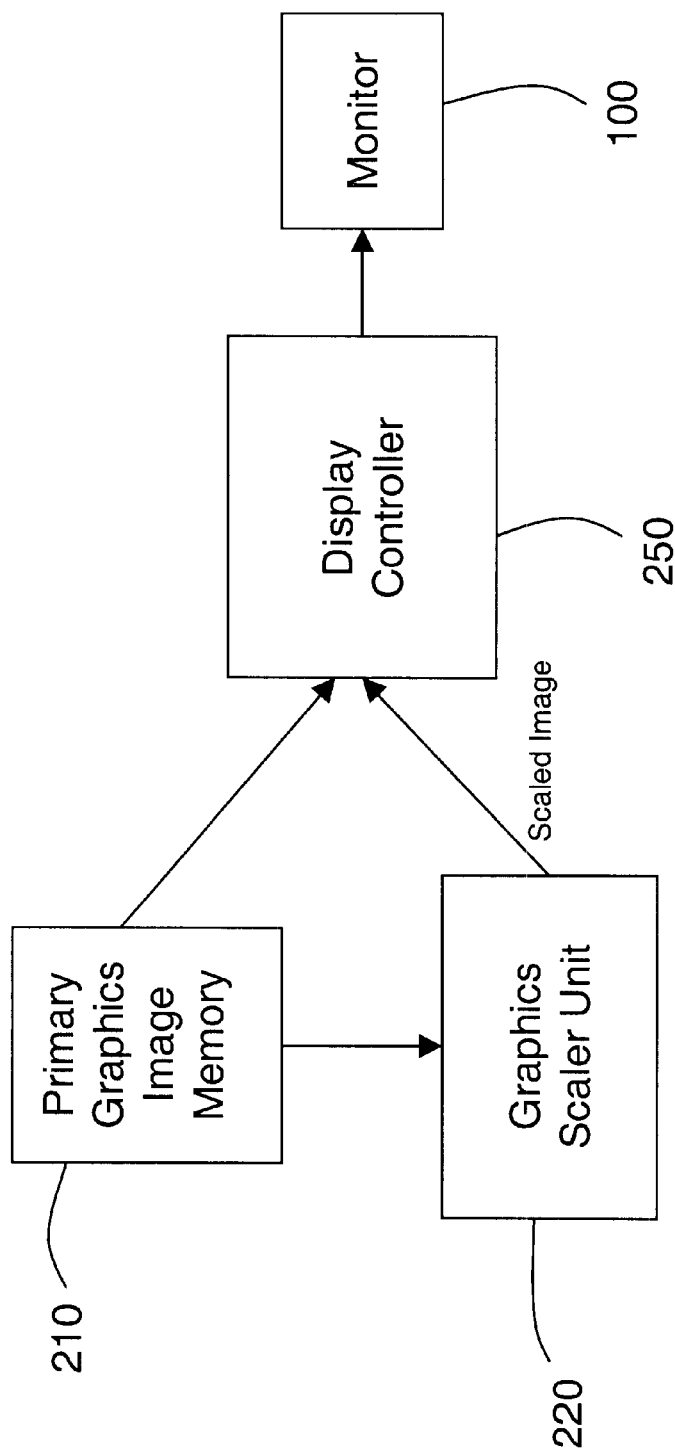
FIG. 2 illustrates system and method for magnifying a portion of a graphics image.
Figure 3:
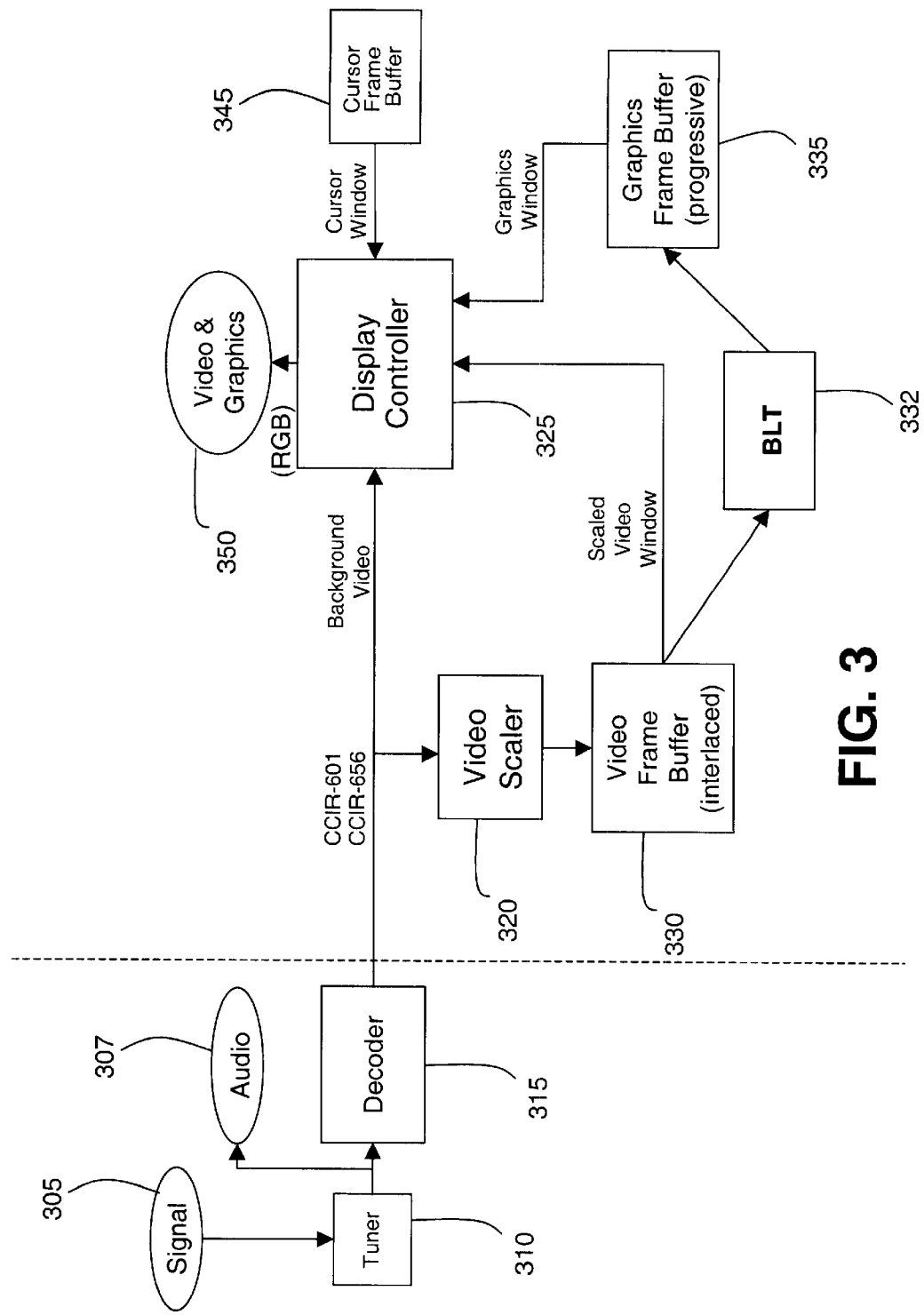
FIG. 3 illustrates one embodiment of a system for magnifying real time video.
Figure 4:
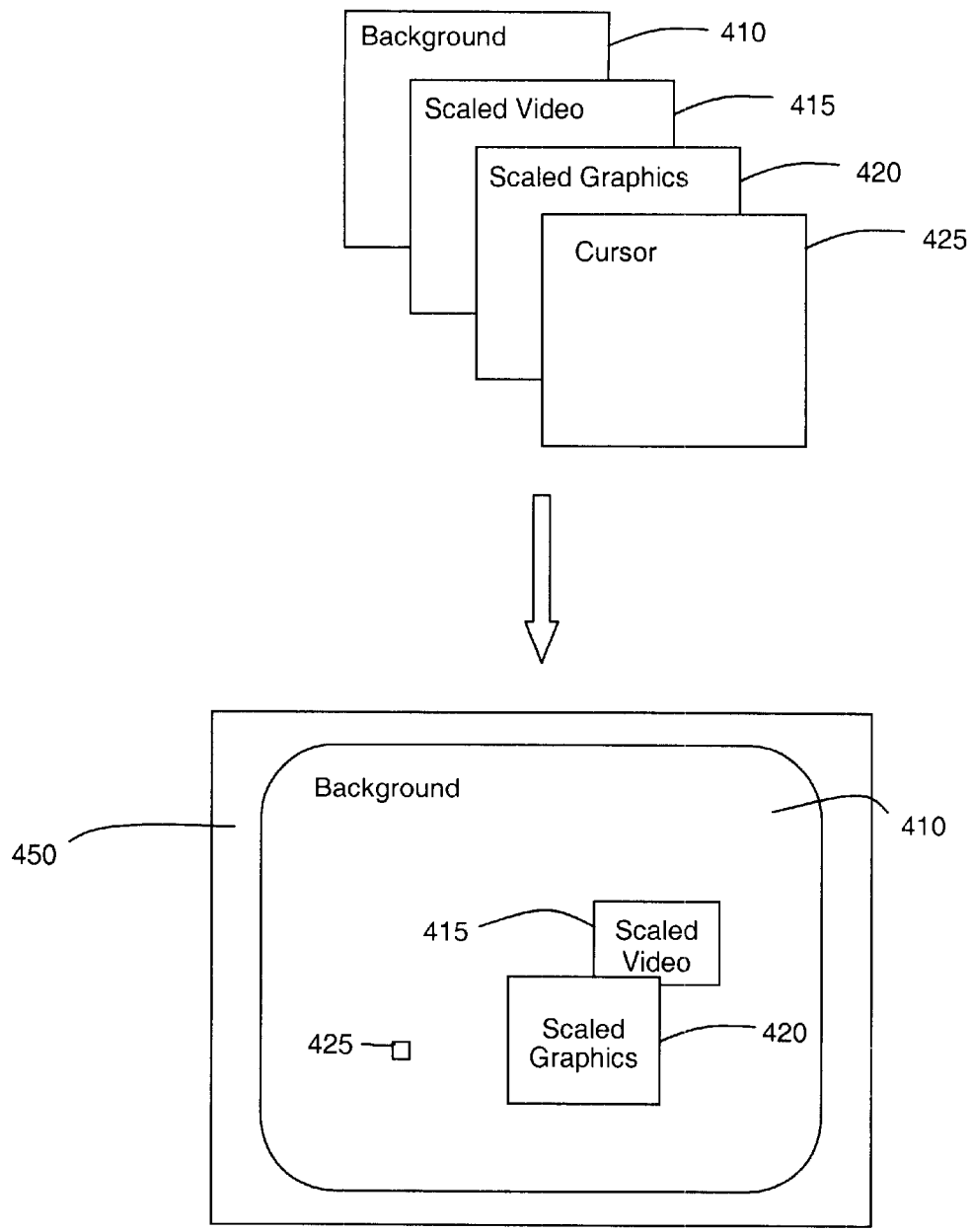
FIG. 4 illustrates one embodiment of the output produced by the system illustrated in FIG. 3.

One embodiment of the system and method for scaling real time video is illustrated in FIG. 3. This embodiment is capable of producing various distinct planes of video and/or graphics images. More specifically, as shown in FIG. 4, these planes may include a background video plane 410, a scaled video plane 415, a scaled graphics plane 420, and/or a cursor plane 425.

A tuner 310 in this embodiment locks on to a signal 305 at a selected carrier frequency (i.e., station, channel) and filters out the audio portion of the signal 307. The video portion of the signal may then be transmitted to a decoder unit 315 which converts the underlying analog video signal into a digital video signal for further processing. In one embodiment of the system and method described herein, the analog video signal is converted to the CCIR-601 (a.k.a. "YCbCr") digital video standard or the CCIR-656 digital video standard, established by the International Radio Consultative Committee.

The digital video signal output by the decoder 315 is transmitted directly to (e.g., read by) a display controller unit 325. The display controller unit 325 interprets the digital video signal and, in response thereto, produces a video signal 350 (e.g., an RGB video signal) which may be interpreted by a video display monitor (e.g., a television, computer monitor . . . etc) to reproduce the underlying video image for the background video plane 410. In one embodiment, this background video plane 410 is opaque and covers the entire active video area of the display 450. The background video plane 410 may display a video image (from one or more of a plurality of video inputs), a tiled bitmap, or a single color image, depending on the configuration selected by the user.

The digital video signal output by the decoder 315 and read directly by the display controller unit 325 may simultaneously be read by a video scaler unit 320. The video scaler unit 320 in one embodiment downscales and crops the digital video signal to a user selected size/resolution and sends the scaled signal to a video frame buffer 330. Alternatively, the video scaler unit 320-at the request of the user-may not downscale or crop the video image at all.

The video frame buffer 330 may comprise an assigned block of a larger memory space or, alternatively, may comprise a separate, independent memory. Regardless of how the memory comprising the video frame buffer 330 is configured, however, the underlying principles of the system and method remain the same.

The display controller unit 325 reads the scaled video data stored in the scaled video frame buffer 330 to produce the scaled video plane (a.k.a., "window") 415 on the display 450. The scaled video plane 415 may be opaque and may be selectively positioned by the user anywhere in the visual area of the display 450. It may also be scaled to any horizontal and vertical size up to the actual size of the display 450.

Figure 5:
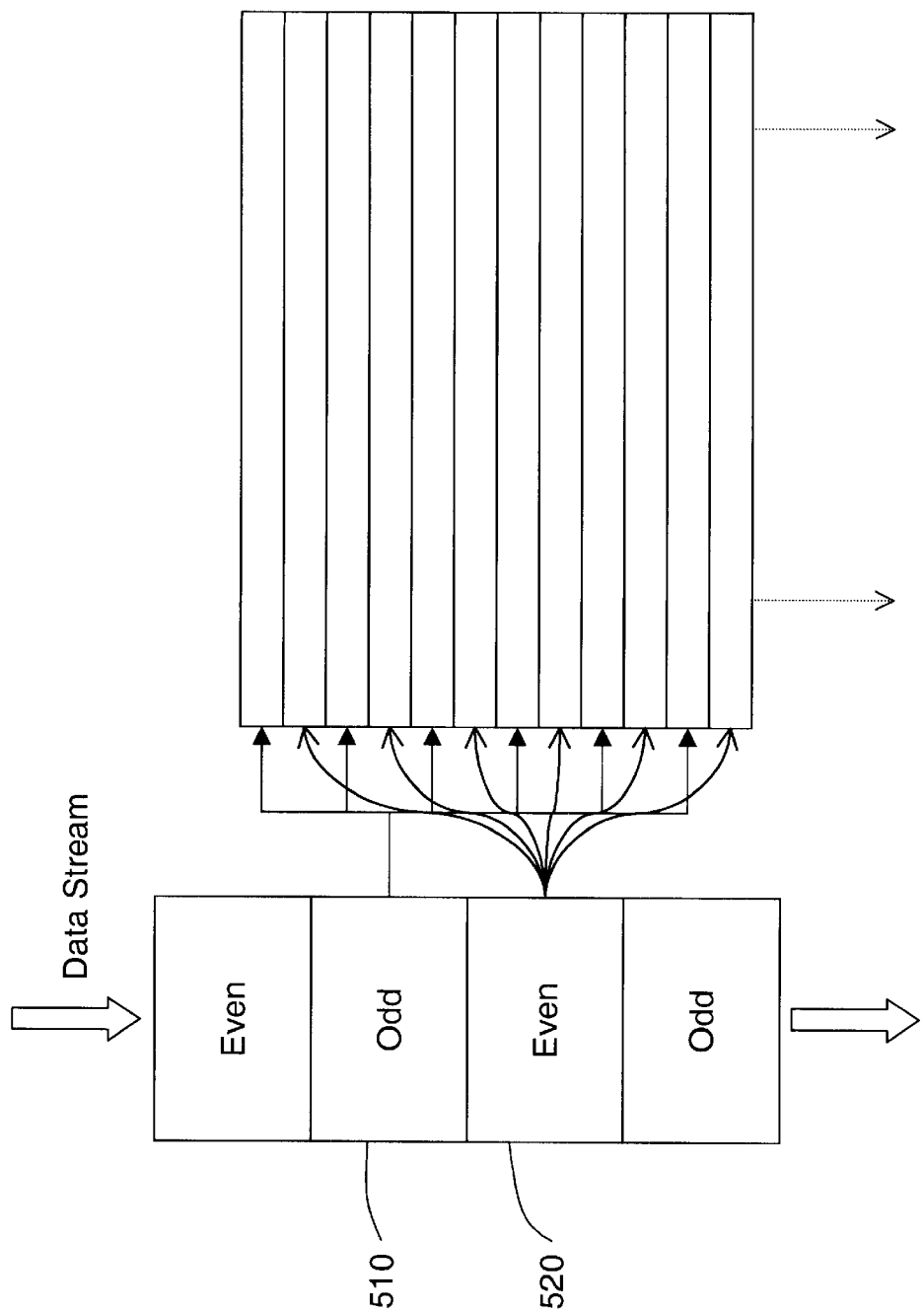
FIG. 5 illustrates a system for reproducing an image on an interlaced display.

As indicated in FIG. 3, if the underlying video signal decoded by decoder 315 is a television signal then the digital video signal read by the video scaler unit 320 and the display controller unit 325 (and written to the video frame buffer 330) is an "interlaced"video signal. An interlaced video signal is a signal which illuminates a display, such as display 450, by first drawing the odd lines of each video frame and then drawing the even lines. Accordingly, as illustrated in FIG. 5, if the decoded video signal is an interlaced signal then the video data being written to and stored in video frame buffer 330 may be separated into a first contiguous block of video data 510 representing the odd lines of a video frame and a second contiguous block of video data 520 representing the even lines of the same video frame. As such, the display controller 325 in this embodiment reads and interprets the odd/even interlaced video data from the decoder 315 and the video frame buffer 330 to produce the appropriate video output 350 for the particular display monitor 450 in use.

In contrast to the interlaced video format described above, the image data stored in the scaled graphics frame buffer 335, in one embodiment of the invention, is non-interlaced, or progressive, image data. A progressive stream of image data is not separated into even-line and odd-line blocks as is an interlaced stream of data. Accordingly, the image data in graphics frame buffer 335 may include a single contiguous block of data read sequentially by the display controller unit 325 to draw the entire scaled graphics plane 420.

The scaled graphics frame buffer 335 may store graphics data (interpreted by the display controller unit 325) for a variety of different graphics resolutions, color depths, and translucency values. In one embodiment, the display controller 325 and the graphics frame buffer 335 support graphics images under the YCbCr (CCIR-601) and/or the CCIR-656 video standards.

Under the YCbCr video standard, horizontally adjacent pixels are divided into sets of two, and each set of two pixels in a video frame is encoded using 32 bits of data. Each of the two pixels is assigned its own 8-bit black & white value (represented by the "Y" in "YCbCr"). In addition, each of the two adjacent pixels is assigned the same color value which is based on an 8-bit Cb value and an 8-bit Cr value. Depending on the particular implementation, the display controller 325 and the graphics frame buffer 335 are capable of supporting numerous other graphics and video frame formats. Alternatively, a line-doubler can perform the interlaced-to-progressive conversion.

The display controller 325 may display varying portions of the graphics data stored in graphics frame buffer 335 in the scaled graphics window 420. It may also magnify portions of the graphics image by different magnification levels (e.g., 2×, 3×, . . . etc). The portion of the graphics image to be displayed, the color depth, display resolution, translucence value, and the level of magnification of the graphics image may be configurable by a user via a cursor control device (e.g., a mouse, keyboard . . . etc). The cursor image to be manipulated by the cursor control device is provided by the display controller 325 based on data stored in the cursor frame buffer 345.

In one embodiment, a stream of video (stored frame by frame in the video frame buffer 330) may be selectively magnified. To carry out the magnification, a bit block transfer (hereinafter "BLT") engine 332 copies each frame of the video data stored in video frame buffer 330 to the graphics frame buffer 335. Once in the graphics frame buffer, the video image (or a portion of the image) may be magnified via the display controller 325 as described above. The display controller unit 325 is able to properly interpret the video data stored in the graphics frame buffer 335 because, as described above, the display controller unit 325 supports a variety of video formats in the graphics plane 420, including the YCbCr video format and the CCIR-656 video format.

One problem which arises, however, is that the video data stored in the video frame buffer 330 is stored in an interlaced frame format as described above (see, e.g., FIG. 5 and corresponding text), whereas graphics images are typically stored in the graphics frame buffer 335 in a progressive format. Thus, when reading from the graphics frame buffer 335, the display controller 325 typically reads each line of data in sequence, rather than reading the odd lines first and then the even lines as it does when reading interlaced data (e.g., video data in video frame buffer 330).

Figure 6:
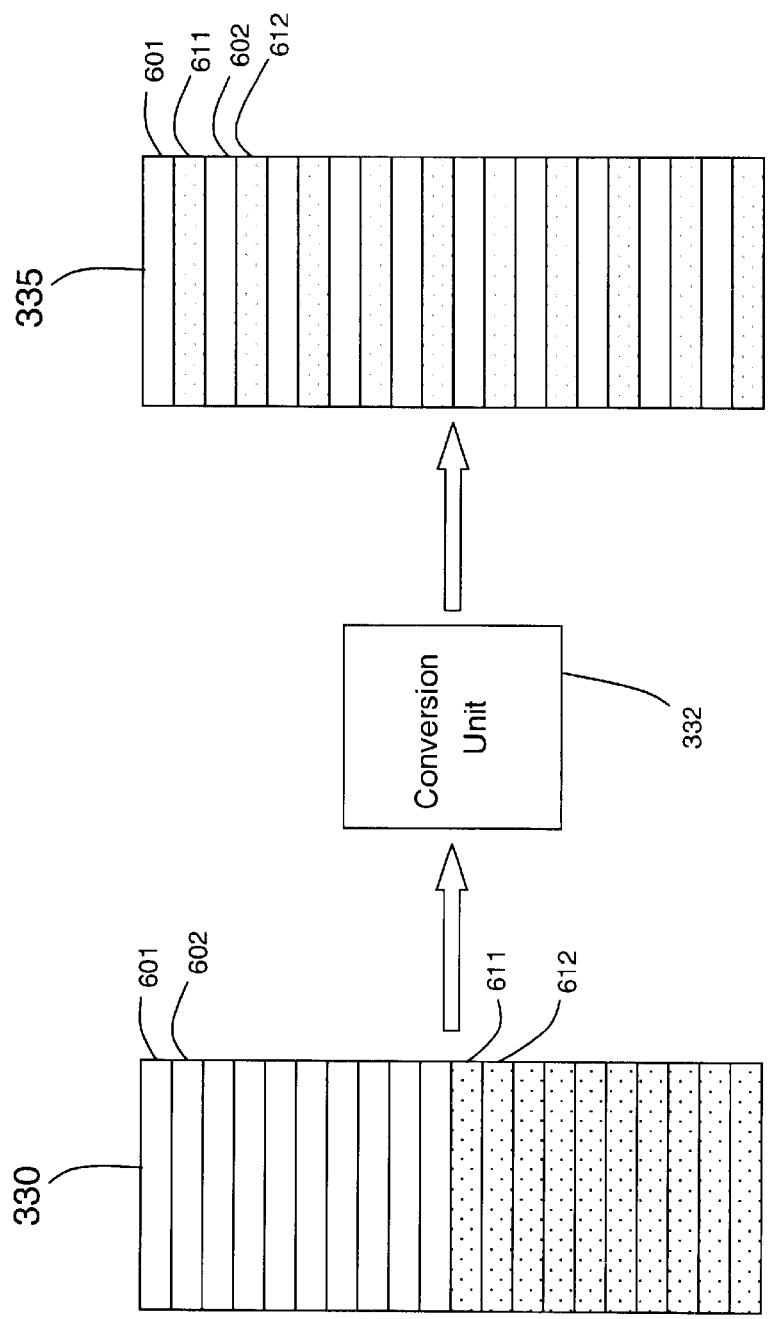
FIG. 6 illustrates one embodiment of a system for converting interlaced data to non-interlaced (progressive) data.

Accordingly, one solution to this problem is to configure a graphics data transfer engine such as a conversion unit 332 to translate the interlaced video data stored in the video frame buffer 330 to a progressive format as it copies the data to the graphics frame buffer 335. Specifically, as illustrated in FIG. 6, the conversion unit 332 may read data from the video frame buffer 330 in sequential order (i.e., line 601, 602, 603 . . . etc), but as it writes the data to the graphics frame buffer 335 line by line, it skips a line after each line it writes.

In one embodiment, this is accomplished by configuring the conversion unit 332 to write to a frame buffer with a pitch that is twice as large as the actual pitch of the graphics frame buffer 335. The "pitch" of a buffer is defined as the number of 32-bit words in each buffer line. For example, if the true pitch of the graphics frame buffer 335 is '80', then the conversion unit 332 will be configured to write to a frame buffer with a pitch of '160.' Accordingly, as shown in FIG. 6, the conversion unit 332 will read each line of data from the video frame buffer 330 sequentially, but will skip an entire line in buffer memory between each successive write to the graphics frame buffer 335. The end result is that the video image (or portions of the video image) may be displayed and magnified in the scaled graphics plane 420 by display controller 325 just like any other graphics image.

A SYSTEM AND METHOD FOR SCALING REAL TIME VIDEO WITH INCREASED RESOLUTION

Figure 7:
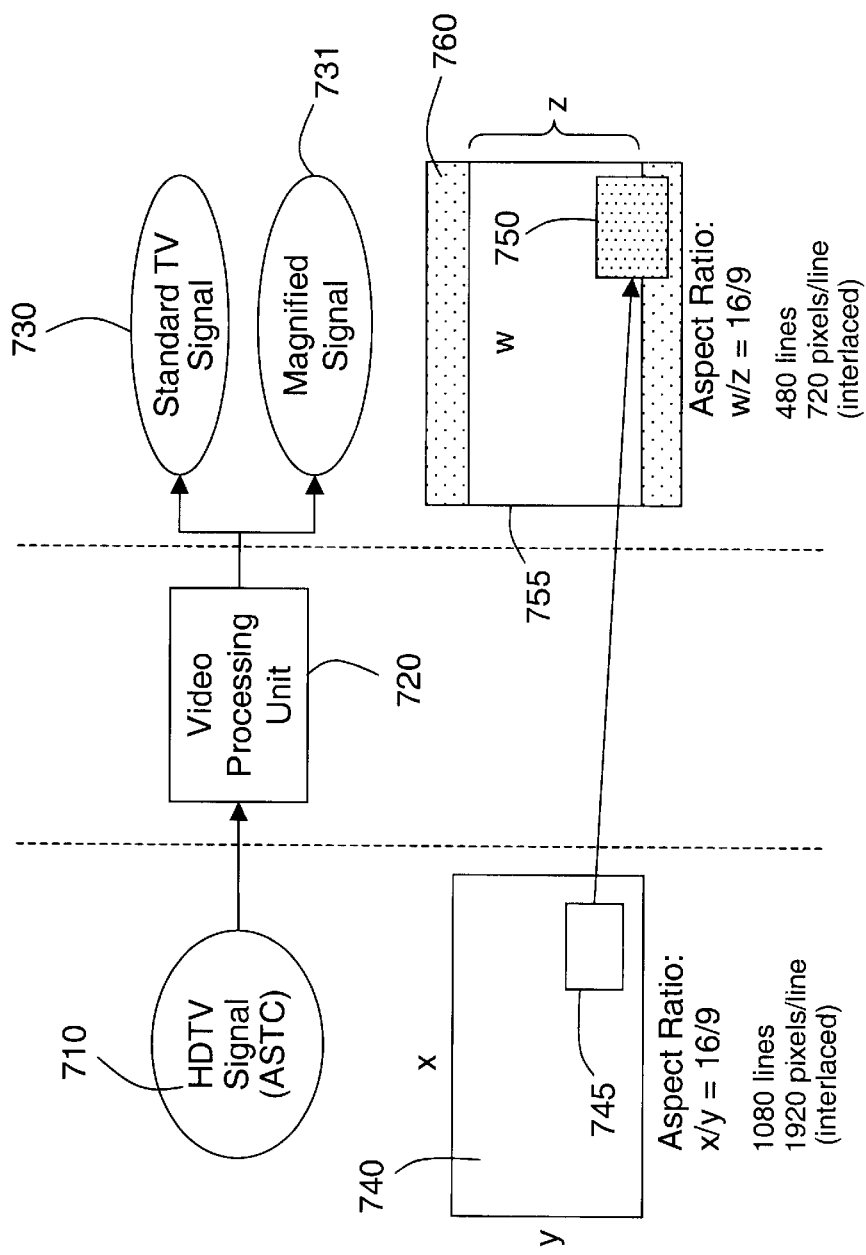
FIG. 7 illustrates a system for producing actual magnification of a video image with increased resolution.
Figure 9:
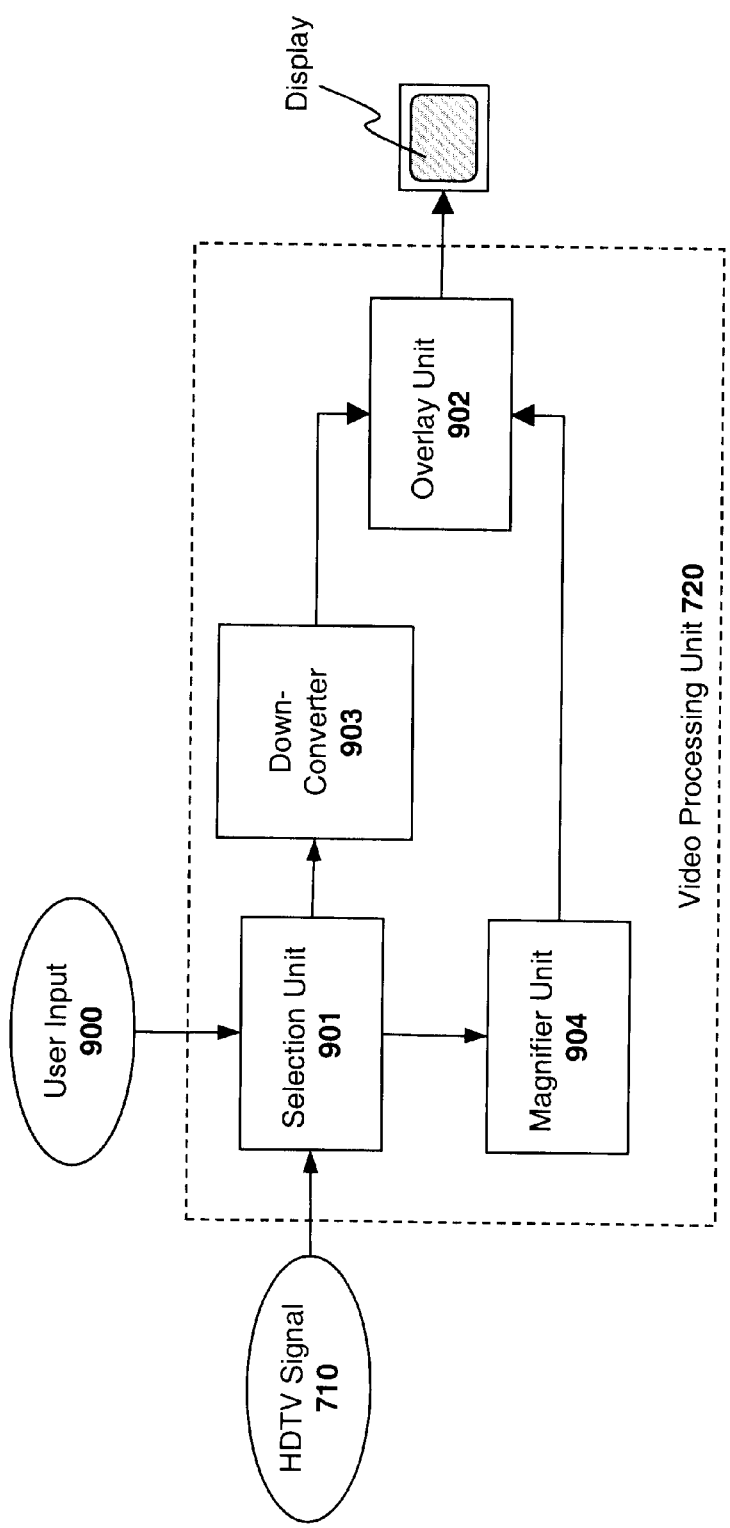
FIG. 9 illustrates one embodiment of a video processing unit in greater detail.

In the embodiment described above, the video image may be magnified by various levels (2×, 3×, . . . etc). However, the magnification as described results in an "empty magnification." That is, the video image is magnified but the underlying resolution of the video image remains the same. With the advent of higher resolution video standards (e.g., High Definition Television), however, it is possible to create a system and method which magnifies video images while concurrently increasing image resolution (i.e., without introducing empty magnification). FIG. 7 illustrates a video processing unit 720 which (among other things) produces true magnification of a video image. As high quality video signals continue to be developed, one or more conversion units will convert the higher quality video signals into signals which standard video systems (e.g., standard television and computer monitors) interpret. The video processing unit illustrated in FIG. 7 is capable of down-converting a high resolution signal 710 to a lower resolution signal 730, generating a magnified signal 731, and overlaying the magnified signal 731 on the lower resolution signal 730, or portion thereof. The low resolution signal 730 and the magnified signal 731 produce low resolution image 755 and magnified image 750, respectively. Accordingly, as illustrated in FIG. 9, processing unit 720 may comprise several functional units: a selection unit 901 to select a specified portion of the image (e.g., in response to user manipulation of an I/O device 900), a downconverter 903 to generate the down-conversion, a magnifier unit 904 for magnifying, and an overlay unit 902 for overlaying.

As indicated in FIG. 7, new high definition video standards are referred to generally as High Definition Television ("HDTV") standards. One such standard is the Advanced Television Standards Committee (hereinafter "ATSC") standard. Although the following discussion will focus on specific HDTV standards (e.g., ATSC), it should be noted that the system and method described herein may be implemented with any high quality and/or standard quality video formats.

ATSC is defined by a display screen 740 with an aspect ratio (screen width/screen height) of 16/9, including up to 1080 lines of video data with up to 1920 pixels/line (interlaced). By contrast, a standard television screen (standard, that is, in the United States) uses an aspect ratio of 4/3, with 480 lines of video data and 720 pixels/line (interlaced). Thus, when converting an ATSC signal 710, to a standard TV signal 730, the original ATSC image 740 is scaled down from 1080×1920 to 720×480. In addition, if the aspect ratio of the ATSC picture is to be maintained, at least two areas 760 (an upper area and a lower area) on the standard television screen will not include any of the scaled down ATSC image as shown in FIG. 7. This effect is known as "letterboxing."

One embodiment contemplates selecting a portion 745 of the primary ATSC image 740 and magnifying it by a specified amount to produce a magnified image 750. However, one significant improvement in this embodiment is that the magnified image 750 does not result in "empty magnification." This is because the original ATSC video image data is used to produce the magnified image 750 on a lower resolution (i.e., lower resolution that ATSC) display. In other words, the primary ATSC image 740 is down-converted so that it can be viewed on a standard TV screen; however, when a user chooses to magnify a portion of the down-converted ATSC image, the magnification is accomplished using a portion of the original ATSC image, which is at a significantly higher resolution than the down-converted image. As such, an actual magnification resulting in improved resolution of the down-converted video image is achieved.

In one embodiment of the method and apparatus, the selected portion 745 of the ATSC image 740 does not need to be scaled to produce actual magnification. Rather, the selected portion 745 merely needs to be overlayed on the down-converted (i.e., standard-definition) image. The selected portion of the down-converted image will effectively be magnified because the ATSC image being overlayed on top of it is at a higher resolution than the down-converted image. Hence, the "magnification" of the down-converted image is accomplished without actually up-scaling the ATSC image 745.

Figure 8:
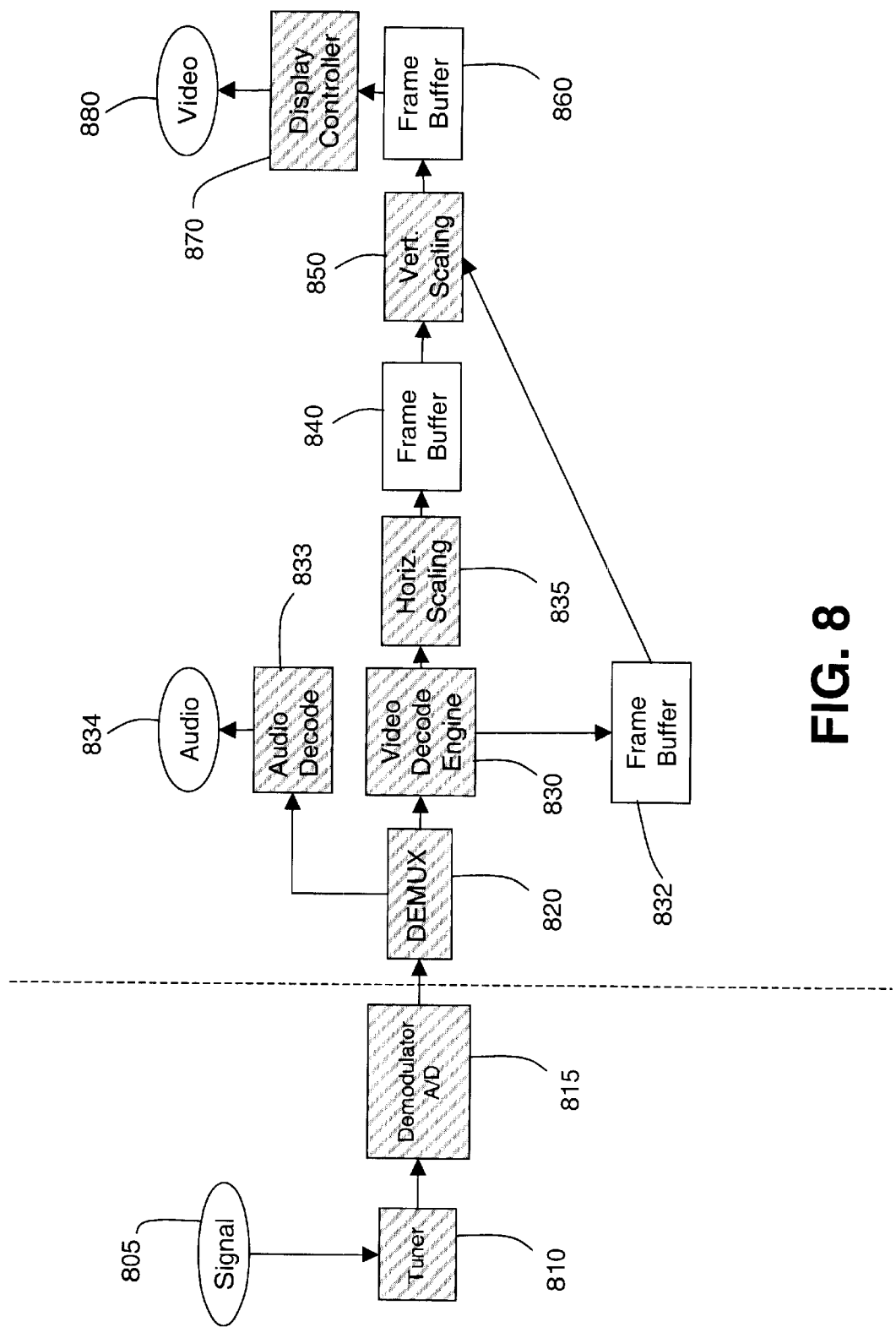
FIG. 8 illustrates a detailed embodiment of a system for producing actual magnification of a video image with increased resolution.

One specific embodiment of the invention will now be described with respect to FIG. 8. The tuner 810 in this embodiment locks on to a signal 805 at a selected carrier frequency (i.e., station, channel). The tuner 810 transmits the selected signal in baseband (e.g., 8 VSB baseband) to a demodulator 815 which converts the analog baseband signal to a digital transport stream. For example, in one embodiment of the invention, the output of the demodulator 815 might be an MPEG 2 transport stream (i.e., 188-byte packets running at 19.4 Mbits/sec).

A demultiplexer 820 receives the digital transport stream and separates the audio and video portions of the stream. The audio portion is sent to an audio decoder 833 which deciphers the digital audio signal and produces the final audio output signal 834 (which may be used to drive a plurality of speakers). The video portion of the stream is sent to a video decode engine 830 which decodes/decompresses the encoded/compressed signal. For example, in one embodiment, the video decode engine 830 includes an MPEG 2 decode unit for decoding MPEG 2 digital signals.

The resulting decoded/decompressed digital signal is transmitted to a horizontal scaling unit 835 and also to a video frame buffer 832. Video frame buffer 832 and other frame buffers described herein may comprise allocated memory spaces within one or more larger memories or, alternatively, may comprise distinct individual memories. Regardless of how the buffer memories are configured, however, the underlying principles of the system remain the same.

The horizontal scaling unit 835 scales (e.g., down-converts) the video data stream horizontally and transfers the horizontally-scaled data to a second frame buffer 840. The level of horizontal down-scaling depends on the specific application at hand. For example, the horizontal scaling may be configured specifically towards ATSC to standard TV conversion (as illustrated in FIG. 7).

A vertical scaling unit 850 reads from the first video frame buffer 832 and the second video buffer 840 concurrently. The vertical scaling unit 850 vertically down-scales the video data read from the second frame buffer 840 to produce the final down-scaled image (e.g., a standard TV image). At the same time, the vertical scaling unit 850 reads from the original, unscaled video data stored in video frame buffer 832. The vertical scaling unit 850 may, at the request of a user, overlay a portion of the unscaled image over part of the final downscaled image. Thus, if a user chooses to magnify a portion of the scaled video image, the vertical scaling unit 850 magnifies the original, unscaled image to produce an actual magnification, resulting in improved resolution of the selected portion of the down-scaled image (as opposed to "empty" magnification).

Finally, the vertical scaling unit 850 transfers the combined video image data (i.e., the image data from the first frame buffer 840 and the second frame buffer 832) to a third frame buffer 860. A display controller 870 reads the video data from the third video frame buffer 860 to produce the actual underlying video signal 880 to be displayed on a monitor.

FIGS. 3 through 8 illustrate specific embodiments contemplated within the scope of the present invention. It should be noted, however, that the specific configurations illustrated in these figures and described in the accompanying text of the specification are not necessary for implementing the underlying principles of the present invention. Accordingly, the scope and spirit of the present invention should be judged in terms of the claims which follow.

What is claimed is:

1. A video processing apparatus comprising:
   selection means to select a portion of a first image for magnification; and
   magnification means to magnify a portion of a second image corresponding to said portion of said first image, said second image being a higher resolution image than said first image.

2. The video processing apparatus as claimed in claim 1 further comprising:
   overlay means to overlay said magnified portion of said second image on said first image.

3. The video processing apparatus as claimed in claim 1 further comprising:
   down-conversion means to down-convert said second image to said first image.

4. The video processing apparatus as claimed in claim 1 wherein said second image is an HDTV video image.

5. The video processing apparatus as claimed in claim 1 wherein said first image is a standard definition television image.

6. The video processing apparatus as claimed in claim 1 wherein said selected portion of said first image is adjusted through manipulation of an I/O device.

7. The video processing apparatus as claimed in claim 6 wherein size of said portion is adjusted.

8. The video processing apparatus as claimed in claim 6 wherein magnification level of said portion is adjusted.

9. The video processing apparatus as claimed in claim 6 wherein a position of said portion is adjusted.

10. A video processing apparatus comprising:
    a selection unit which selects a portion of a first image for magnification; and
    a magnification unit which magnifies a portion of a second image corresponding to said portion of said first image, said second image being a higher resolution image than said first image.

11. The video processing apparatus as claimed in claim 10 further comprising an overlay unit for overlaying said magnified portion of said second image on said first image.

12. The video processing apparatus as claimed in claim 10 further comprising a down-conversion unit for down-converting said second image to said first image.

13. The video processing apparatus as claimed in claim 10 wherein said second image is an HDTV video image.

14. The video processing apparatus as claimed in claim 10 wherein said first image is a standard definition television image.

15. The video processing apparatus as claimed in claim 10 wherein said selection unit adjusts said selected portion of said first image in response to manipulation of an I/O device.

16. The video processing apparatus as claimed in claim 15 wherein said selection unit adjusts the size of said portion.

17. The video processing apparatus as claimed in claim 15 wherein said selection unit adjusts the magnification level of said portion.

18. The video processing apparatus as claimed in claim 15 wherein said selection unit adjusts the overlay position of said portion.

19. A video processing apparatus comprising:
    a scaling unit for converting a first video image at a first resolution to a second video image at a second resolution;
    a magnification unit for magnifying a portion of said first video image; and
    an overlay unit for overlaying said magnified portion of said first video image on said second video image.

20. The video processing apparatus as claimed in claim 19 further comprising:
    a selection unit which selects said portion of said first video image for magnification responsive to selection of a corresponding portion of said second video image.

21. The video processing apparatus as claimed in claim 20 wherein said selection of a corresponding portion of said second video image is accomplished in response to a signal from an I/O device.

22. The video processing apparatus as claimed in claim 20 wherein said selection unit modifies said selected portion of said first video image.

23. The video processing apparatus as claimed in claim 22 wherein said selection unit modifies the position of said selected portion of said first video image.

24. The video processing apparatus as claimed in claim 22 wherein said selection unit modifies the magnification level of said selected portion of said first video image.

25. A video processing apparatus comprising:
- a scaling unit for converting a first video image at a first resolution to a second video image at a second resolution;
- a selection unit for selecting a portion of said second video image; and
- an overlay unit for overlaying a portion of said first video image on said second video image, said portion of said first video image corresponding to said selected portion of said second video image.

26. The video processing apparatus as claimed in claim 25 wherein said selection unit selects a portion of said second video image responsive to a signal from an I/O device.

27. The video processing apparatus as claimed in claim 26 wherein said selection unit modifies said selected portion of said first video image.

28. The video processing apparatus as claimed in claim 27 wherein said selection unit modifies the position of said selected portion of said first video image.

29. The video processing apparatus as claimed in claim 27 wherein said selection unit modifies the magnification level of said selected portion of said first video image.

* * * * *